United States Patent [19]

von der Eltz et al.

[11] 3,972,904
[45] Aug. 3, 1976

[54] WATER-SOLUBLE DYESTUFFS READILY CONVERTIBLE INTO INSOLUBLE FORM AND PROCESS FOR PREPARING THEM

[75] Inventors: Hans-Ulrich von der Eltz, Frankfurt am Main; Dieter Günther, Kelkheim, Taunus; Karl-Heinz Krell, Kronberg; Karl Matterstock, Hofheim, Taunus, all of Germany; Hansjörg Vollmann, Coventry, R.I.

[73] Assignee: Hoechst Aktiengesellschaft, Frankfurt am Main, Germany

[22] Filed: June 28, 1971

[21] Appl. No.: 157,667

[30] Foreign Application Priority Data
June 30, 1970 Germany.......................... 2032237

[52] U.S. Cl............................ 260/372; 260/155; 260/158; 260/160; 260/163; 260/187; 260/191; 260/207; 260/207.1; 260/283 S; 260/314.5; 260/376; 260/377; 260/455 A; 260/553 D; 260/243 R

[51] Int. Cl.² ...................... C09B 1/36; C09B 1/38; D06P 3/52

[58] Field of Search............. 260/160, 207.1, 314.5, 260/330.5, 372, 376, 377

[56] References Cited
UNITED STATES PATENTS

| | | | |
|---|---|---|---|
| 2,799,673 | 7/1957 | Bolliger............................ | 260/163 |
| 3,213,077 | 10/1965 | Maderni et al. ................ | 260/145 A |
| 3,213,079 | 10/1965 | Maderni et al. ................ | 260/147 |
| 3,260,713 | 7/1966 | St. Alban........................ | 260/163 |
| 3,261,827 | 7/1966 | Boresch et al. ................. | 260/163 |
| 3,429,870 | 2/1969 | Carati et al. .................... | 260/153 |
| 3,544,548 | 12/1970 | Günther et al.................... | 260/152 |
| 3,585,033 | 6/1971 | Desjarlais........................ | 260/203 X |
| 3,617,163 | 11/1971 | Kalopissis et al. ............. | 260/205 X |
| 3,631,020 | 12/1971 | Weaver et al...................... | 260/158 |
| 3,636,065 | 1/1972 | Guye-Vuilleme.................. | 260/376 |
| 3,705,914 | 12/1972 | Pickles et al..................... | 260/396 R |

OTHER PUBLICATIONS
Graf, Ber. Deut. Chem. Gesell., vol. 96, pp. 56–67.

*Primary Examiner*—Floyd D. Higel
*Attorney, Agent, or Firm*—Curtis, Morris & Safford

[57] ABSTRACT

Water-soluble dyestuffs of the general formula

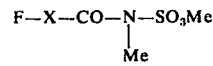

wherein F represents the radical of a water-insoluble anthraquinone dyestuff, X represents an oxygen atom, a sulfur atom or a nitrogen atom which is substituted by a hydrogen atom, a lower alkyl, phenyl, lower acyl or sulfonyl group and Me represents an alkali metal or ammonium ion made by solubilizing insoluble dyestuffs which may be indigo, nitro, azo, imide, anthraquinone, oxazine, thiazine, dioxazine, quinoline, methine, polymethine or phthalocyanine dyestuffs. The water-soluble dyestuffs are adapted to be used in dyeing and printing synthetic fibers and are characterized by the fact that they can easily be converted during the process of dyeing to the original water-insoluble dyestuffs by the influence of heat. They are especially useful for the dyeing of polyester in which material they yield deep dyeings.

4 Claims, No Drawings

WATER-SOLUBLE DYESTUFFS READILY CONVERTIBLE INTO INSOLUBLE FORM AND PROCESS FOR PREPARING THEM

It is known that the dyeing and printing of articles made of unmodified polyesters is quite difficult. In the industry, satisfactory dyeings and prints are obtained with disperse dyestuffs, if necessary with the use of carriers or by the action of elevated temperatures. The manufacture of the dyestuff preparations required for these dyeing and printing methods is very expensive, in particular because in many cases it is very difficult to obtain the stability and fine dispersion of the dyestuff powders, pastes or magmas which is required for their storage and application.

In order to overcome these difficulties, it has already been proposed to temporarily convert the dyestuffs to be used for the printing or dyeing of synthetic fibers, for example cellulose triacetate, cellulose-2,5 acetate, polyamide and polyurethane fibers, especially however polyester fibers such as polyethylene terephthalate fibers, into a water-soluble form from which the original dyestuff molecules are re-formed during the dyeing or printing process. These proposals concern derivatives of sulfuric acid or of phosphoric acid, such as esters or amides, of the dyestuffs to be used, which are built into the finished dyestuffs or, during their synthesis, into one of their pre-stages. The principles of operation are described in more detail in German Pat. Nos. 1,057,558; 1,061,330 and 1,151,330.

The present invention provides new water-soluble dyestuffs of the general formula I

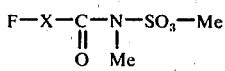  (I), in which
F represents the radical of a water-insoluble dyestuff,
X represents an oxygen atom, a sulfur atom or a nitrogen atom and wherein the latter may be substituted by a hydrogen atom, an alkyl, aryl, acyl or sulfonyl radical, and
Me represents an alkali metal ion or an ammonium ion.

The invention furthermore provides a process for preparing the above-specified dyestuffs, which comprises reacting water-insoluble dyestuffs of the general formula II

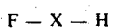 (II)

in which F and X have the meanings given above, with halogenosulfonyl-isocyanates of the general formula III

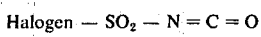 (III)

and converting them by the addition of alkali metal salts or ammonium salts into compounds of the formula

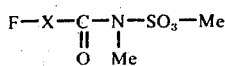

As starting dyestuffs, there may be used all dyestuffs of any class of dyestuffs, especially those used in industry, provided they contain at least one hydroxy, one mercapto or one amino group.

The dyestuff classes the representatives of which are suitable for the process according to the invention are the following: those of nitrodyestuffs, disazo dyestuffs, imide dyestuffs, anthraquinone dyestuffs, oxazine dyestuffs, thiazine dyestuffs, dioxazine dyestuffs, quinoline dyestuffs, methine dyestuffs, polymethine dyestuffs, and phthalocyanine dyestuffs.

As halogeno-sulfonyl-isocyanates of the general formula III there may be used in the process of the invention especially fluoro- and bromo-, in particular the chloro-sulfonyl-isocyanate which is easily accessible on an industrial scale.

The reaction of compounds of the general formulae II and III is carried out in general in solvents which are inert to compounds of the general formula III. As such inert solvents there may be used, for example aliphatic or aromatic hydrocarbons such as pentane, cyclohexane, benzene, toluene, xylene, aliphatic or aromatic halogeno-hydrocarbons such as methylene chloride, chloroform, carbon tetrachloride, difluorotetrachloroethane or trifluoro-trichloroethane, bromobenzene, di- or trichlorobenzene, aliphatic or aromatic nitrated hydrocarbons such as nitromethane or nitrobenzene, ethers such as diethyl ether, tetrahydrofurane, dioxane or ethylene glycol dimethyl ether, acetonitrile or sulfolane, as well as mixtures of these solvents. By reason of the high reactivity of the halogenosulfonyl isocyanates used according to the invention, the desired formation of the compounds of the general Formula I is also reached if the starting compounds of the general formula II are not completely dissolved under the reaction conditions.

The reaction of the compounds is in general effected at temperatures in the range of from 0° C and 110° C, preferably between room temperature and 50° C. A preferred mode of operation consists in allowing the reaction components to react with each other at room temperature, if necessary while cooling.

The molar ratio of the reaction components used can be varied within wide limits. If the starting dyestuff contains only one reactive hydrogen atom, it is suitable to use the reaction components in a molar ratio of at least 1 : 1, if it is desired to completely convert the dyestuff into its soluble form. In general, a molar excess of halogeno-sulfonyl-isocyanate of between 10 and 30% is of advantage.

If the starting dyestuff contains several reactive hydrogen atoms, they can be caused to react in general stepwise, especially if they have a different reactivity. Normally, the number of reacted hydrogen atoms depends, owing to the high reactivity of compounds of type III, only on the molar ratio II : III, but it can also be influenced by variation of the solvent or temperature used.

In order to obtain the water-soluble final products of the invention of formula I, it is necessary to hydrolize to a free acid the halogeno-sulfonylurea, halogeno-sulfonylcarbamic acid ester or halogeno-sulfonyl-thiocarbamic acid ester compounds and to convert them into the corresponding salts. This is carried out by reaction of these intermediate products with alkali metal salts or ammonium salts which show a basic reaction in an aqueous solution, for example oxides, hydroxides, alcoholates, carbonates, hydrogeno-carbonates or acetates. Hydroxides or carbonates such as potassium hydroxide, sodium carbonate or sodium bicarbonate, or ammonium compounds such as ammonium hydroxide or ammonium carbonate are preferably used for this purpose. In the reaction of the sulfohalide-containing intermediate products to obtain their salts it is necessary to use three equivalents of base for one sulfohalide group.

The reaction of the sulfohalide-groups containing intermediate products, which precipitate in general in the inert solvent used and are therefore easily to isolate, for example by filtration or decantation, with the alkali metal compounds or ammonium compounds is suitably carried out in water or in solvents which are miscible with water, for example alcohols such as methanol, ethanol or isopropanol, amides, preferably, dimethylformamide, ethers such as tetrahydrofuran or dioxane, acetonitrile, acetone or dimethyl sulfoxide. The reaction of the reactive intermediate compounds and the alkali metal or ammonium compounds is in general carried out at temperatures in the range of from 0° C to 50° C, preferably between 0° C and 20° C. In most cases, the reaction can be carried out, by suitable choice of the solvents, in such a way that the desired final products precipitate from the mixture in an easily filtrable form.

The products of the invention so obtained are distinguished by a very good solubility in water and have the property of being reformed, when dissolved, into the starting substances of the general formula II at temperatures from 50° C upwards, in particular under the conditions of the dyeing of polyester at temperatures above 100° C, whereas the compounds described in German Pat. Nos. 1,057,558; 1,061,330 and 1,151,330 do not re-form completely the original dyestuff even at elevated temperatures. Furthermore, the compounds of the invention are distinguished by the fact that the dyestuffs are obtained upon cleavage in a very fine distribution which yields more intensive shades when wound bobbins are dyed and yields a saving of dyestuff. The desired cleavage may also be promoted by the addition of acids or acid separating agents.

The invention is illustrated by the following Examples:

EXAMPLE 1

22.8 g of finely ground 1-amino-2-phenoxy-4-hydroxy-anthraquinone were suspended in 150 ml of anhydrous methylene chloride and combined with a mixture of 7.5 cc. of chloro-sulfonylisocyanate and 20 ml of methylene chloride at room temperature. After having been stirred for 8 hours at room temperature, the sulfochloride containing intermediate product was filtered off with suction and dried. 26.6 g of red brown powder were obtained, which were then introduced into a mixture of a solution of 6.6 g of sodium hydroxyde in 15 ml of water and 500 ml of acetone at 0° C. The whole was allowed to heat up slowly, while stirring, to room temperature and the di-sodium salt that precipitated was filtered off with suction. 28.5 g of a red dyestuff of the formula

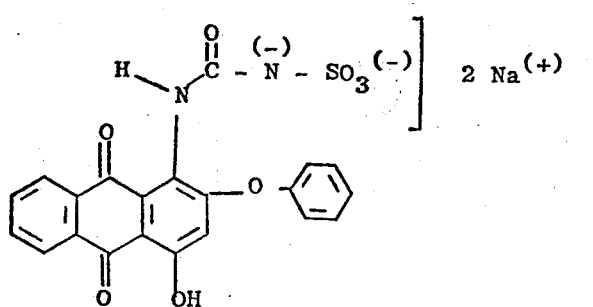

which was found to be easily soluble in cold water were obtained.

The following anthraquinone dyestuffs could be transformed in the same manner into their water-soluble form:

Anthraquinone dyestuffs

Disperse Red 9 (CI 60505), Disperse Orange 11 (CI 60700), Disperse Red 15 (CI 60710), Disperse Blue 22 (CI 60715), Disperse Dye (Blue)(CI 60740), Disperse Red 4 (CI 60755), Disperse Violett 1 (CI 61100), Disperse Violett 4 (CI 61105), Disperse Blue 19 (CI 61110), Disperse Dye (CI 61120), Disperse Violett 6 (CI 61140), Disperse Blue 3 (CI 61505), Disperse Blue 34 (CI 61510), Disperse Dye (CI 61535), Disperse Dye (CI), Disperse Blue 23 (CI 61545), Disperse Red 11 (CI 62015), Disperse Violett 8 (CI 62030), Disperse Blue 5 (CI 62035), Disperse Dye (CI 62040), Disperse Blue 28 (CI 62065), Disperse Blue 7 (CI 62500), Disperse Dye (CI 62580), Disperse Dye (CI 63295), Disperse Dye (CI 63600), Disperse Red 3 (CI 60507),

EXAMPLE 2

2.9 g of pulverized 1-amino-2-phenoxy-4-hydroxy-anthraquinone were suspended at room temperature in 50 ml of ethylene glycol dimethyl ether and then 1 ml of chlorosulfonyl-isocyanate were added thereto, while stirring. A temperature increase of 6° C and a change of colour from red to red brown were observed. The whole was further stirred for 2 hours and a solution of 1.5 g of sodium hydroxide in 2 ml of water was added. The reaction mixture was stirred for 30 minutes at 0° C, then filtered and the residue was washed with ethylene glycol dimethyl ether and dried. 4.2 g of a water-soluble product were obtained which product was found to be identical with that obtained according to Example 1.

EXAMPLE 3

2.9 g of pulverized 1-amino-2-phenoxy-4-hydroxy-anthraquinone were suspended, while stirring, in 50 cc. of methylene chloride and then combined with 1 ml of chlorosulfonyl-isocyanate. A rise in temperature of 7° C and a change of colour from red to brown were observed. The whole was stirred for 3 hours, then filtered with suction and washed with methylene chloride and dried. 4 g of a red brown powder were obtained which were introduced into a solution of 1.2 g of potassium hydroxide in 240 ml of methanol at 0° C. Stirring was continued for 30 minutes at 0° C, the product was filtered off with suction, washed with methanol and dried. 4 g of a red brown dyestuff which was easily soluble in cold water and corresponded to the formula

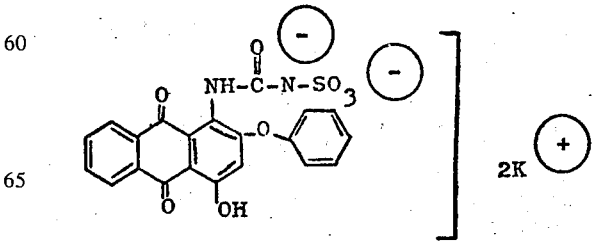

were obtained.

EXAMPLE 4

2.9 g of pulverized 1-amino-2-phenoxy-4-hydroxy-anthraquinone were suspended, while stirring, in 50 ml of methylene chloride and combined with 1 ml of chlorosulfonyl-isocyanate. The temperature rose by 7° C and the colour changed from red to brown. The whole was stirred for 3 hours at room temperature the product was filtered off with suction and dried. 4 g of a red brown powder were obtained and introduced at 0° C into a mixture of 4 ml of 25% aqueous ammonia and 240 ml of acetone. The whole was stirred for 30 minutes at 0° C, filtered off with suction, washed with acetone and dried, whereupon 3.8 g of a dyestuff which was easily soluble in cold water and corresponded to the formula

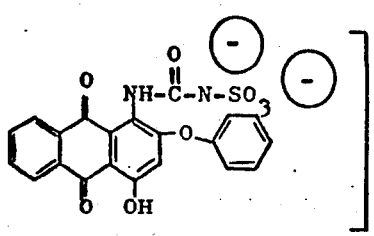

were obtained.

EXAMPLE 5

A mixture of 24 ml of chlorosulfonyl-isocyanate in 100 ml of methylene chloride was added at room temperature to a suspension of 90 g of the dyestuff of the formula

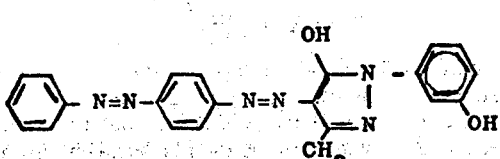

in 1300 ml of methylene chloride. A temperature rise of 6° C and a change of colour from orange to dark brown were observed. Stirring was continued for 7 hours at room temperature, the product was filtered off with suction and dried. 117.8 g of a brown powder were obtained and introduced, while cooling, at 10° C into a solution of 28 g of NaOH in 1000 ml of methanol and stirred for 3.5 hours at this temperature. The solvent was then removed by distillation under reduced pressure at 35° C. After drying of the residue, 130 g of a dyestuff which was clearly soluble in water and corresponded to the formula

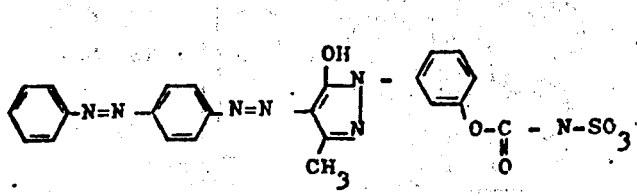

were obtained.

EXAMPLE 6

68 g of the dyestuff of the formula

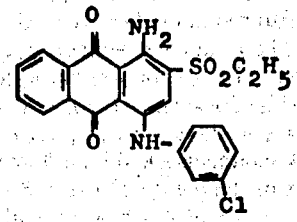

were suspended in 600 ml of methylene chloride. A mixture of 20 ml of chlorosulfonyl-isocyanate in 50 cc. of methylene chloride was added at room temperature. A temperature rise of 10°C and a slow change of colour from blue to dark red to brown was observed. The whole was stirred for 7 hours, the product was filtered off with suction and dried. 83.7 g of the dyestuff chloride of the formula

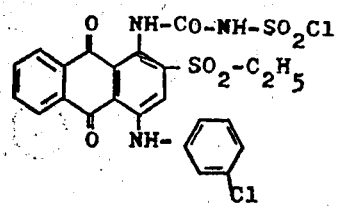

in the form of a brown powder were obtained.

$C_{23}H_{17}Cl_2N_3O_7S_2$ (581.4) Calc.: Cl 12.19; Found: 12.10

5.8 g of the above described dyestuff sulfochloride were introduced at room temperature into a solution of 1.2 g of sodium hydroxide in 150 ml of methanol and the whole was stirred for 5 hours. The resulting product was filtered off with suction and dried, whereupon 5.3 g of a dyestuff which was easily soluble in cold water and corresponded to the formula

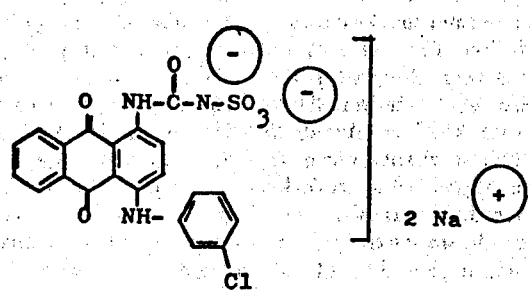

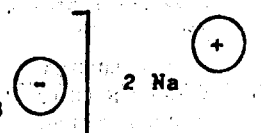

were obtained.

EXAMPLE 7

3.3 g of 5,5'-diamino-dithio-indigo were suspended in 100 ml of acetonitrile and combined with 1.5 g of chlorosulfonyl-isocyanate, whereupon a change of the colour from blue to red could be observed. The whole was stirred for 12 hours at room temperature, the product was filtered off with suction, washed with acetonitrile and dried. 4.5 g of a red powder were obtained; the powder was introduced into a solution of 0.45 g of NaOH in 150 ml of methanol and the whole was stirred for 1 hour at room temperature. After filtration with suction and drying, 4.5 g of a blue dyestuff were obtained which was easily soluble in water and corresponded to the formula

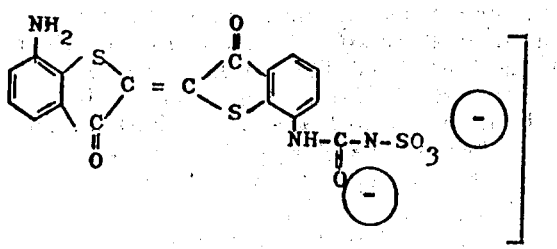

EXAMPLE 8

22.3 g of 1-amino-anthraquinone were finely pulverized and suspended in 400 ml of toluene; then, chlorosulfonyl-isocyanate was added dropwise and slowly, while maintaining the temperature below 30° C by cooling. The whole was stirred for 10 hours at room temperature and the yellow, sulfochloride groups containing intermediate product was filtered off under exclusion of moisture. After washing with diethyl ether and drying, 35 g of yellow crystals were obtained. These were introduced at room temperature into a mixture of 121 g of sodium hydroxide in 1000 ml of methanol, whereupon an orange solution was formed under slight evolution of heat and from which orange coloured crystals precipitated when cooled to −30° C. After filtration with suction, washing with cold methanol and drying, 32 g of light orange crystals were obtained which are easily soluble without residue in water at room temperature.

| Analysis Calc. | C | 46.2 % | Found: | 45.9 % |
|---|---|---|---|---|
| | H | 2.1 % | | 2.5 % |
| | S | 8.2 % | | 7.9 % |

By using methanolic potassium hydroxide solution, there could be isolated in the same manner the corresponding potassium salt which is more soluble in methanol and also in water as the sodium salt.

EXAMPLE 9

12.3 g of pulverized 1,5-dihydroxy-4,8-diamino-3-bromoanthraquinone were suspended, while stirring, in 150 ml of anhydrous benzene. A mixture of 15 g of chlorosulfonyl-isocyanate and 20 ml of benzene was added dropwise at room temperature. The colour changed thereupon from blue to red brown. The whole was stirred for 5 hours at room temperature. The reaction mixture was poured, while cooling with ice and while stirring, into a solution of 20 g of sodium hydroxide in 300 ml of methanol and the whole was stirred for 2 hours at room temperature. After filtration and drying, 30 g of a blue dyestuff which was easily soluble in water and corresponded to the formula

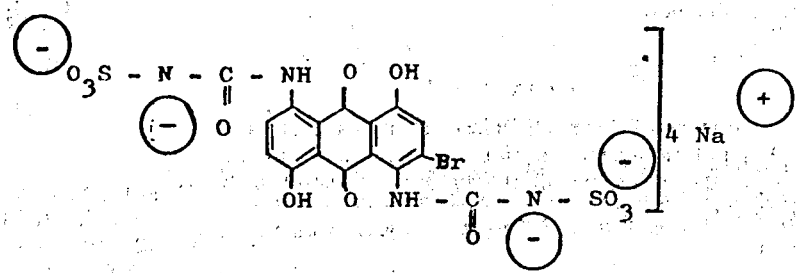

were obtained.

EXAMPLE 10

2.7 g of 1,4-diamino-2-methoxy-anthraquinone were heated for 30 minutes under reflux with 150 ml of anhydrous methylene chloride. After cooling to room temperature, a mixture of 2 g of chlorosulfonyl-isocyanate and 20 ml of methylene chloride was added dropwise, while stirring. The colour changed from red to yellow green. The whole was stirred for 4 hours at room temperature. The reaction mixture was then poured, while cooling with ice and stirring, into a solution of 2 g of sodium hydroxide in 30 ml of methanol and stirred for 2 hours at room temperature. The resulting product was filtered off, washed with methylene chloride and dried. 2.7 g of a red dyestuff which was soluble in water and corresponded to the formula

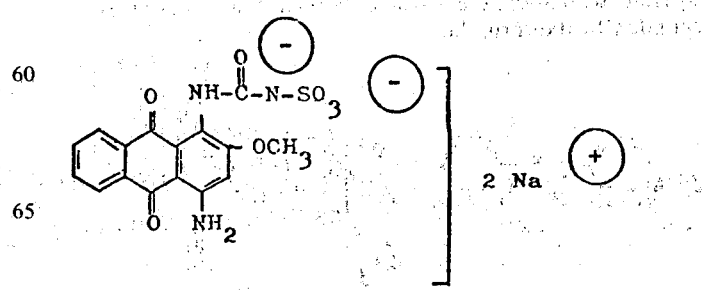

were obtained.

EXAMLE 11

3.15 g of 1-amino-2-(β-hydroxyethyl)-mercapto-4-hydroxyanthraquinone were heated for 30 minutes with 150 ml of anhydrous methylene chloride. After cooling to room temperature, a mixture of 2 g of chlorosulfonyl-isocyanate and 20 ml of methylene chloride was added dropwise, while stirring. Stirring was continued for 4 hours at room temperature. The reaction mixture was then poured, while cooling with ice and stirring, into a solution of 2 g of sodium hydroxide in 30 ml of methanol and stirring was continued for 2 hours at room temperature. After filtration with suction, 6.5 g of a red dyestuff which was soluble in water and corresponded to the formula

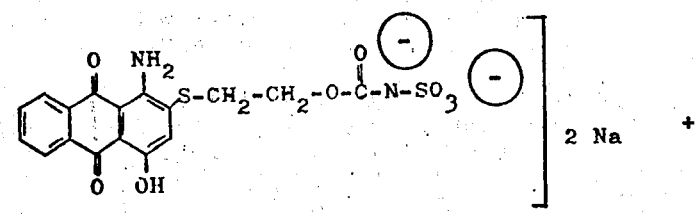

were obtained.

EXAMPLE 12

3.4 g of the dyestuff of the formula

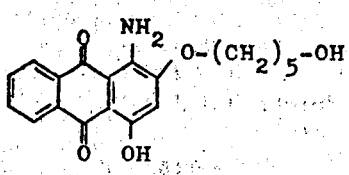

were heated for 30 minutes under reflux with 150 cc. of anhydrous methylene chloride. After cooling to room temperature, a mixture of 2 g of chlorosulfonyl-isocyanate and 20 ml of anhydrous methylene chloride was added dropwise. The colour thereupon changed from red to light brown. The whole was further stirred for 4 hours at room temperature. The reaction mixture was poured, while stirring and cooling with ice, into a solution of 2 g of sodium hydroxide in 30 ml of methanol and stirred for 2 hours. After filtration with suction, 5.8 g of a red dyestuff which was soluble in water and corresponded to the formula

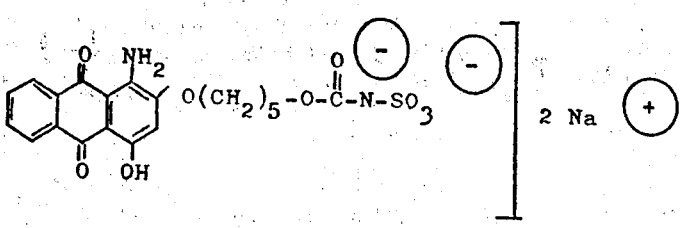

were obtained.

Analysis: $C_{20}H_{18}Na_2N_2O_9S$ (508,43): Calc.: S: 6.3%; Na: 9.05%. Found: S: 6.0% Na: 9.5%.

EXAMPLE 13

3 g of pulverized 1,5-dihydroxy-4-(N-methoxy)-amino-8-amino-anthraquinone were heated for 30 minutes under reflux with 150 ml of methylene chloride. After cooling to room temperature, a mixture of 2 g of chlorosulfonyl-isocyanate and 20 ml of methylene chloride was added dropwise, while stirring. Stirring was continued for 4 hours at room temperature. The reaction mixture was then poured, while cooling with ice and stirring, into a solution of 2 g of sodium hydroxide in 30 ml of methanol and stirred for 2 hours at room temperature. The product was filtered off with suction and washed with methylene chloride. 5.5 g of a blue dyestuff which was soluble in water and corresponded to the formula

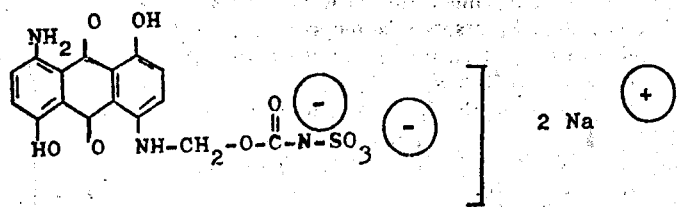

were obtained.

EXAMPLE 14

2.9 g of 4-nitro-4'-(N-oxethyl)-amino-azobenzene were heated for 30 minutes under reflux with 100 ml of methylene chloride. After cooling to room temperature, a mixture of 2 g of chlorosulfonyl-isocyanate and 20 ml of methylene chloride was added dropwise, while stirring, and the whole was further stirred for 4 hours at room temperature. The reaction mixture was then poured, while cooling with ice and stirring, into a solution of 2 g of sodium hydroxide in 30 cc. of methanol and stirred for 2 hours at room temperature. The solvent was removed by distillation under reduced pressure, whereupon 5.5 g of an orange dyestuff which was soluble in water and corresponded probably to the formula

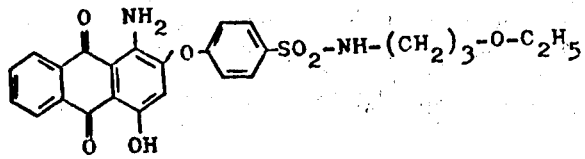

were obtained as residue.

EXAMPLE 15

5 g of the dyestuff of the formula

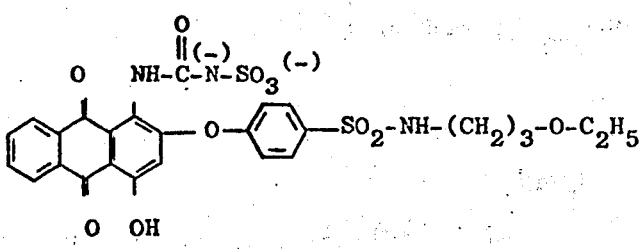

were heated for 30 minutes under reflux with 150 ml of anhydrous methylene chloride. After cooling to room temperature, a mixture of 2 g of chlorosulfonyl-isocyanate and 20 ml of methylene chloride was added. Thereupon, the color changed from red to light yellow. Stirring was continued for 4 hours at room temperature. The reaction mixture was then poured, while cooling with ice and stirring, into a solution of 2 g of sodium hydroxide in 30 ml of methanol and stirred for 1 hour at room temperature. The solvent was removed under reduced pressure, whereupon 6.9 g of a red dyestuff which was easily soluble in water and corresponded to the formula

EXAMPLE 16

3.2 g of the disazo dyestuff of the formula

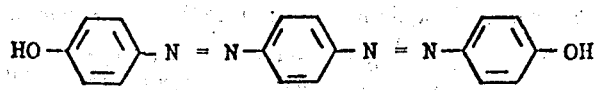

were heated for 30 minutes under reflux with 150 ml of anhydrous methylene chloride. After cooling to room temperature, a mixture of 2 g of chlorosulfonyl-isocyanate and 20 ml of methylene chloride was added. Stirring was continued for 4 hours at room temperature. The reaction mixture was then poured, while cooling with ice and stirring, into a solution of 2 g of sodium hydroxide in 30 ml of methanol and stirred for 2 hours at room temperature. The solvent was then removed under reduced pressure.

As residue, 7.1 g of a yellow dyestuff which was easily soluble in water and corresponded to the formula

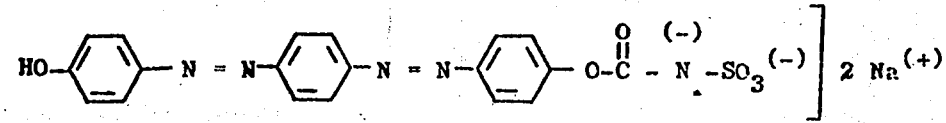

were obtained.

In the same manner, the following disazo dyestuffs could be converted into their soluble form: disazo dyestuffs such, for example, as Solvent Orange 13 (CI 26075), Solvent Red 24 (CI 26105), Solvent Red 27 (CI 26125).

EXAMPLE 17

2.7 g of 2-hydroxy-5-methyl-4'-acetylamino-azobenzene were suspended in 150 ml of methylene chloride. A mixture of 2 g of chlorosulfonyl-isocyanate and 20 ml of methylene chloride was added dropwise, while stirring, at room temperature. Stirring was continued

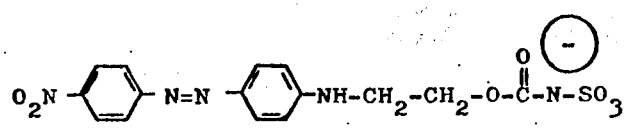

were obtained as residue.

for 4 hours at room temperature. The reaction mixture was then poured, while cooling with ice and stirring, into a solution of 2 g of sodium hydroxide in 30 ml of methanol and stirred for 2 hours at room temperature. After filtration with suction and washing with isopropanol, 4.4 g of a yellow dyestuff which was soluble in water and corresponded to the formula

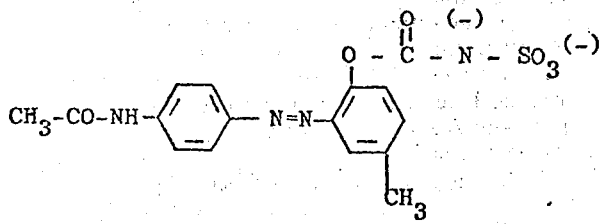

were obtained.

Analysis $C_{16}H_{14}Na_2N_4O_6S$ (436.37): S: calc.: 7.37%; S: found: 7.1%.

EXAMPLE 18

3.8 g of pulverized 1-amino-2-(4-methylmercapto)-phenoxy-4-hydroxy-anthraquinone were suspended, while stirring, in 150 cc. of anhydrous methylene chloride and heated for 30 minutes under reflux. After cooling to room temperature, a mixture of 2 g of chlorosulfonyl-isocyanate and 20 ml of methylene chloride was added dropwise and the whole was stirred for 4 hours at room temperature. The colour changed thereupon from red to yellow brown. The reaction mixture was then poured, while cooling with ice and stirring vigourously, into a mixture of 2 g of sodium hydroxide, 5 ml of water and 50 ml of methylene chloride. The whole was stirred for 2 hours at room temperature, the product was filtered off with suction and dried. 4.6 g of a red dyestuff which was easily soluble in water and corresponded to the following formula

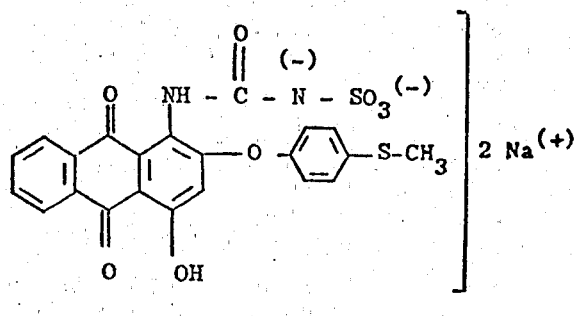

were obtained.

In the same manner, the following monoazo dyestuffs could be converted into a water-soluble form:
Disperse Orange 3 (CI 11005), Disperse Black 3 (CI 11025), Disperse Orange 1 (CI 11080), Disperse Red 1 (CI 11110), Disperse Red 13 (CI 11115), Disperse Violett 12 (CI 11120), Disperse Red 19 (CI 11130), Disperse Dye 11135, Disperse Dye 11180, Disperse Violett 13 (CI 11195), Disperse Red 16 (CI 11225), Disperse Dye 11230, Disperse Orange 7 (CI 11240), Disperse Black 2 (CI 11255), Disperse Dye 11310, Disperse Blyck 1 (CI 11365), Disperse Violett 7 (CI 11410), Disperse Dye 11420, Disperse Blue (CI 11435), Disperse Yellow 3 (CI 11855), Disperse Yellow 16 (CI 12700), Disperse Yellow 4 (CI 12770), Disperse Yellow 5 (CI 12790), Disperse Blue 11 (CI 11260).

EXAMPLE 19

3.9 g of 1,5-dihydroxy-3-bromo-4,8-diamino-anthraquinone were heated for 30 minutes under reflux with 150 ml of o-dichlorobenzene. After cooling to room temperature, a mixture of 2 g of chlorosulfonyl-isocyanate and 20 ml of o-dichlorobenzene was added dropwise and the whole was stirred for 4 hours at room temperature. The reaction mixture was then poured, while cooling with ice and stirring, into a solution of 2 g of sodium hydroxide in 30 ml of methanol and stirred for 2 hours at room temperature. After filtration with suction and drying, 6.4 g of a blue dyestuff which was soluble in water and corresponded to the formula

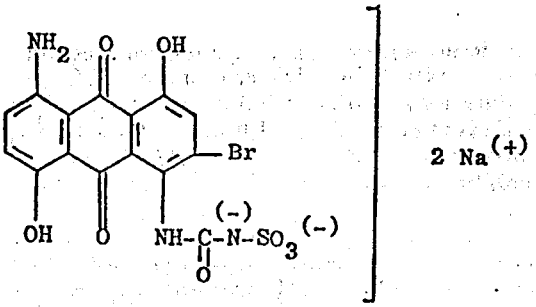

were obtained.

EXAMPLE 20

5.3 g of Ni-phthalocyanine-$(SO_2NH-CH_2-CH_2-OH)_4$ were suspended in 150 ml of methylene chloride and heated for 30 minutes to reflux temperature. After cooling to room temperature, a mixture of 3 g of chlorosulfonyl-isocyanate and 20 ml of methylene chloride was added dropwise and the whole was stirred for 4 hours at room temperature. The reaction mixture was then poured, while cooling with ice and stirring, into a solution of 2.5 g of sodium hydroxide in 30 ml of methanol and stirred for 2 hours at room temperature. After filtration with suction and drying, 7.8 g of a green blue dyestuff which was easily soluble in water and corresponded to the formula

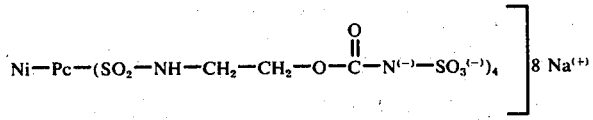

were obtained.

EXAMPLE 21

3.2 g of 3-hydroxy-4-mercapto-quinophthalone were heated to the boiling temperature for 30 minutes with 150 ml of methylene chloride. After cooling to room temperature, a mixture of 2 g of chlorosulfonyl-isocyanate and 20 ml of methylene chloride was added dropwise, while stirring and the whole was stirred for 4 hours at room temperature. The reaction mixture was then poured, while cooling with ice and stirring, into a solution of 2 g of sodium hydroxide in 30 ml of methanol. The mixture was then stirred for 2 hours at room temperature, filtered and the filtrate was concentrated under reduced pressure to dryness. As residue, 5 g of a yellow dyestuff which was soluble in water and corresponded to the formula

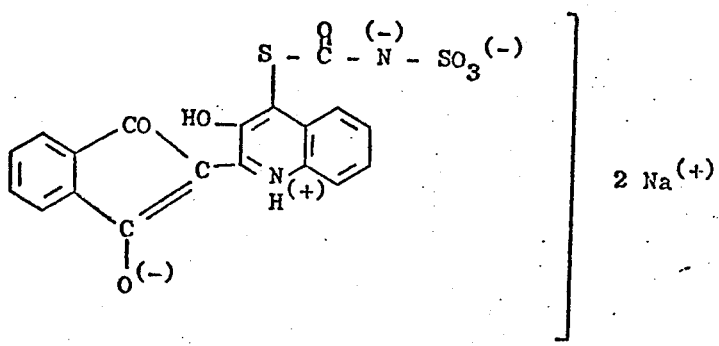

In the same manner, nitro dyestuffs such as Disperse Yellow 14 (CI 10340), Disperse Orange 15 (CI 10350) or Disperse Yellow 9 (CI 10375), imido dyestuffs such as Disperse Yellow 11 (CI 56200), oxazine, thiazine and dioxazine dyestuffs as well as quinoline dyestuffs, methine and polymethine dyestuffs and phthalocyanine dyestuffs could be converted into their water-soluble form.

We claim:

1. A water-soluble dyestuff of the formula

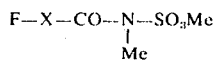

wherein F represents the radical of a water-insoluble anthraquinone dyestuff, X represents oxygen, sulfur, or nitrogen substituted by hydrogen or lower alkyl, and Me represents an alkali metal or ammonium ion.

2. A water-soluble dyestuff according to claim 1 wherein F represents the radical of a water-insoluble anthraquinone dyestuff, X represents NH and Me represents sodium.

3. A water-soluble dyestuff according to claim 1 wherein X represents oxygen and Me represents sodium.

4. A water-soluble dyestuff according to claim 1 wherein X represents sulfur and Me represents sodium.

* * * * *